(12) United States Patent
Winkel et al.

(10) Patent No.: US 9,440,299 B2
(45) Date of Patent: Sep. 13, 2016

(54) METHOD OF MANUFACTURING MULTIPLE IDENTICAL GEARS USING A GEAR CUTTING MACHINE

(75) Inventors: Oliver Winkel, Kempten (DE); Erwin Bodenmüller, Dietmannsried (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 96 days.

(21) Appl. No.: 13/159,890

(22) Filed: Jun. 14, 2011

(65) Prior Publication Data
US 2012/0209418 A1 Aug. 16, 2012

(30) Foreign Application Priority Data
Jun. 14, 2010 (DE) .................. 10 2010 023 728

(51) Int. Cl.
| | | |
|---|---|---|
| B23F 23/00 | (2006.01) | |
| G05B 19/00 | (2006.01) | |
| F16H 1/00 | (2006.01) | |
| B23F 23/12 | (2006.01) | |
| F16H 1/16 | (2006.01) | |
| G05B 19/19 | (2006.01) | |

(52) U.S. Cl.
CPC ............. *B23F 23/1218* (2013.01); *F16H 1/16* (2013.01); *G05B 19/19* (2013.01)

(58) Field of Classification Search
USPC ......................................... 700/160, 161, 164
See application file for complete search history.

(56) References Cited

U.S. PATENT DOCUMENTS

| | | | | | |
|---|---|---|---|---|---|
| 3,595,130 | A | * | 7/1971 | Maker ..................... | B23F 5/20 409/10 |
| 3,662,650 | A | * | 5/1972 | Maker ..................... | B23F 5/20 407/28 |
| 3,711,910 | A | * | 1/1973 | Strejc ..................... | B23F 13/06 407/25 |
| 3,717,913 | A | * | 2/1973 | Maker ..................... | B23F 5/20 407/20 |
| 3,797,361 | A | * | 3/1974 | Redin ..................... | B23F 1/04 409/8 |

(Continued)

FOREIGN PATENT DOCUMENTS

| | | |
|---|---|---|
| DE | 19911235 | 9/2000 |
| DE | 10 2005 022863 | 11/2006 |

OTHER PUBLICATIONS

Schriefer, H.: "Continuous CNC Gear Grinding," Mar. 1, 1996, pp. 1-21.

*Primary Examiner* — Mohammad Ali
*Assistant Examiner* — Kelvin Booker
(74) *Attorney, Agent, or Firm* — Dilworth & Barrese, LLP.

(57) ABSTRACT

The invention relates to method of manufacturing a multiple of identical gears by means of cutting machining, in particular hob cutting or hob grinding, on a gear-cutting machine, wherein workpieces are machined by means of a rotating tool which is brought into engagement with the workpiece via the control of NC axes of the gear cutting machine. In accordance with the invention, deviations from workpiece to workpiece are compensated by a respective different control of at least one of the NC axes of the gear cutting machine.

16 Claims, 5 Drawing Sheets

(56) References Cited

U.S. PATENT DOCUMENTS

| | | | | |
|---|---|---|---|---|
| 3,812,759 A * | 5/1974 | Wildhaber | B23F 1/06 | |
| | | | 409/40 | |
| 3,812,760 A * | 5/1974 | Wildhaber | B23F 1/06 | |
| | | | 409/40 | |
| 3,893,816 A * | 7/1975 | Payne | F01C 21/102 | |
| | | | 29/527.6 | |
| 3,915,060 A * | 10/1975 | Koga | B23F 9/10 | |
| | | | 409/53 | |
| 3,999,332 A * | 12/1976 | Zakharov | 451/21 | |
| 4,174,914 A * | 11/1979 | Ainoura | B23C 3/36 | |
| | | | 407/26 | |
| 4,218,159 A * | 8/1980 | Langen | B23C 5/12 | |
| | | | 407/25 | |
| 4,309,926 A * | 1/1982 | Ainoura | B23C 3/36 | |
| | | | 409/292 | |
| 4,321,839 A * | 3/1982 | Vuilleumier | 74/462 | |
| 4,329,096 A * | 5/1982 | Herscovici | 409/15 | |
| 4,339,895 A * | 7/1982 | Fivian | 451/47 | |
| 4,512,694 A * | 4/1985 | Foran et al. | 409/12 | |
| 4,565,474 A * | 1/1986 | Charles | B23F 5/20 | |
| | | | 409/38 | |
| 4,573,372 A * | 3/1986 | Abe | B23F 15/00 | |
| | | | 74/422 | |
| 4,618,297 A * | 10/1986 | Bishop | B23F 3/00 | |
| | | | 409/58 | |
| 4,663,721 A * | 5/1987 | Herscovici | 700/160 | |
| 4,744,263 A * | 5/1988 | Kuiken | F16H 1/12 | |
| | | | 74/457 | |
| 4,765,095 A * | 8/1988 | Wiener | 451/5 | |
| 4,802,278 A * | 2/1989 | Vanderpol | B23D 21/08 | |
| | | | 30/101 | |
| 4,848,976 A * | 7/1989 | Crockett | B23F 21/284 | |
| | | | 407/27 | |
| 4,862,868 A * | 9/1989 | Dodd | B23F 23/1225 | |
| | | | 125/11.03 | |
| 4,902,175 A * | 2/1990 | Faulstich | B23F 23/12 | |
| | | | 408/1 R | |
| 4,926,712 A * | 5/1990 | Stritzel | B23F 13/06 | |
| | | | 409/12 | |
| 4,991,353 A * | 2/1991 | Wiener | 451/11 | |
| 5,000,632 A * | 3/1991 | Stadtfeld | B23F 9/10 | |
| | | | 409/26 | |
| 5,044,127 A * | 9/1991 | Ryan | 451/47 | |
| 5,074,080 A * | 12/1991 | Erhardt et al. | 451/342 | |
| 5,136,522 A * | 8/1992 | Loehrke | 700/164 | |
| 5,174,699 A * | 12/1992 | Faulstich | B23F 5/163 | |
| | | | 409/26 | |
| 5,175,962 A * | 1/1993 | Pedersen | 451/5 | |
| 5,228,814 A * | 7/1993 | Suwijn | B23F 5/04 | |
| | | | 409/12 | |
| 5,260,879 A * | 11/1993 | Sasaki et al. | 700/170 | |
| 5,310,295 A * | 5/1994 | Palmateer, Jr. | B23F 9/10 | |
| | | | 409/13 | |
| 5,494,475 A * | 2/1996 | Basstein | B23F 15/06 | |
| | | | 407/28 | |
| 5,662,514 A * | 9/1997 | Masseth | B23F 21/226 | |
| | | | 451/48 | |
| 5,716,174 A * | 2/1998 | Stadtfeld | B23F 9/025 | |
| | | | 409/26 | |
| 5,800,103 A * | 9/1998 | Stadtfeld | B23F 9/025 | |
| | | | 409/26 | |
| 5,839,861 A * | 11/1998 | Schuon | 409/2 | |
| 5,839,943 A * | 11/1998 | Stadtfeld | B23Q 17/2216 | |
| | | | 451/48 | |
| 5,856,618 A * | 1/1999 | Beishline | 73/115.03 | |
| 5,885,199 A * | 3/1999 | Shao | 483/19 | |
| 5,895,180 A * | 4/1999 | Stadtfeld | B23F 21/226 | |
| | | | 407/22 | |
| 5,904,457 A | 5/1999 | Suwijn et al. | | |
| 5,931,612 A * | 8/1999 | Basstein | B24B 3/12 | |
| | | | 407/12 | |
| 6,217,409 B1 * | 4/2001 | Stadtfeld | B23F 5/04 | |
| | | | 451/147 | |
| 6,311,590 B1 * | 11/2001 | Stadtfeld | 82/1.11 | |
| 6,450,740 B1 * | 9/2002 | Mundhenke et al. | 409/12 | |
| 6,575,812 B2 * | 6/2003 | Wirz | 451/9 | |
| 6,577,917 B1 * | 6/2003 | Ronneberger | B23F 23/1218 | |
| | | | 700/164 | |
| 6,609,858 B1 * | 8/2003 | Francis | B23F 21/226 | |
| | | | 407/113 | |
| 6,739,943 B2 * | 5/2004 | Wirz | 451/5 | |
| 6,983,664 B2 * | 1/2006 | Tokumoto | B62D 6/10 | |
| | | | 73/862.329 | |
| 7,083,496 B2 * | 8/2006 | Yanase et al. | 451/5 | |
| 7,377,731 B1 * | 5/2008 | Arvin | B23F 19/12 | |
| | | | 409/11 | |
| 8,137,160 B2 * | 3/2012 | Kurashiki et al. | 451/47 | |
| 8,366,513 B2 * | 2/2013 | Demmler | B24B 53/12 | |
| | | | 451/11 | |
| 8,663,142 B1 * | 3/2014 | Pansiera | A61F 5/01 | |
| | | | 128/846 | |
| 8,823,367 B2 * | 9/2014 | Fukui | 324/207.25 | |
| 9,108,258 B2 * | 8/2015 | Stadtfeld | B23F 15/06 | |
| 9,212,891 B2 * | 12/2015 | Masuo | G01B 5/202 | |
| 9,327,356 B2 * | 5/2016 | Nakagawa | B23F 5/04 | |
| 2001/0022098 A1 * | 9/2001 | Wirz | 72/17.3 | |
| 2002/0019195 A1 * | 2/2002 | Asano et al. | 451/8 | |
| 2002/0081161 A1 * | 6/2002 | Yamada | B23F 21/16 | |
| | | | 407/20 | |
| 2002/0081162 A1 * | 6/2002 | Bucholz et al. | 407/23 | |
| 2002/0170373 A1 * | 11/2002 | Kim et al. | 74/462 | |
| 2004/0040133 A1 * | 3/2004 | Ronneberger | B23F 5/02 | |
| | | | 29/28 | |
| 2005/0064794 A1 * | 3/2005 | Blasberg | B23F 9/10 | |
| | | | 451/5 | |
| 2005/0086025 A1 * | 4/2005 | Nomura | G01B 21/04 | |
| | | | 702/167 | |
| 2005/0265800 A1 * | 12/2005 | Endo et al. | 409/2 | |
| 2005/0279430 A1 * | 12/2005 | Hoffman | B23D 61/021 | |
| | | | 148/586 | |
| 2006/0005653 A1 * | 1/2006 | Fleytman | F16H 1/06 | |
| | | | 74/425 | |
| 2006/0025050 A1 * | 2/2006 | Yanase et al. | 451/5 | |
| 2006/0090340 A1 * | 5/2006 | Fleytman | B23F 9/025 | |
| | | | 29/893.3 | |
| 2006/0261517 A1 * | 11/2006 | Ojima | B23H 9/003 | |
| | | | 264/261 | |
| 2007/0137352 A1 * | 6/2007 | Hrushka | 74/425 | |
| 2007/0202774 A1 * | 8/2007 | Yanase et al. | 451/5 | |
| 2007/0214643 A1 * | 9/2007 | Nagata et al. | 29/893.35 | |
| 2007/0275638 A1 | 11/2007 | Baldeck et al. | | |
| 2007/0283545 A1 * | 12/2007 | Langerfeld | B23F 5/205 | |
| | | | 29/56.5 | |
| 2007/0295130 A1 * | 12/2007 | Tan | 74/417 | |
| 2008/0116734 A1 * | 5/2008 | Bechem et al. | 299/10 | |
| 2008/0268756 A1 * | 10/2008 | Schenk | B23F 23/1225 | |
| | | | 451/177 | |
| 2008/0279642 A1 * | 11/2008 | Stadtfeld | B23F 21/226 | |
| | | | 407/21 | |
| 2009/0028655 A1 * | 1/2009 | Ribbeck et al. | 409/27 | |
| 2009/0049942 A1 * | 2/2009 | Miyaoku | F16H 55/08 | |
| | | | 74/462 | |
| 2009/0227182 A1 * | 9/2009 | Breith et al. | 451/5 | |
| 2010/0041314 A1 * | 2/2010 | Kurashiki et al. | 451/10 | |
| 2010/0204814 A1 * | 8/2010 | Neumaier et al. | 700/97 | |
| 2010/0221079 A1 * | 9/2010 | Neumaier et al. | 700/159 | |
| 2010/0272534 A1 * | 10/2010 | Yanase et al. | 409/1 | |
| 2010/0304642 A1 * | 12/2010 | Mundt | 451/5 | |
| 2011/0008119 A1 * | 1/2011 | Neumaier et al. | 409/84 | |
| 2011/0032538 A1 * | 2/2011 | Maschirow | G01B 11/2416 | |
| | | | 356/602 | |
| 2011/0058913 A1 * | 3/2011 | Brieden et al. | 409/211 | |
| 2011/0151756 A1 * | 6/2011 | Rudolf | B24B 53/12 | |
| | | | 451/443 | |
| 2011/0183131 A1 * | 7/2011 | Maeda | B23F 21/00 | |
| | | | 428/216 | |
| 2011/0183585 A1 * | 7/2011 | Woelfel | 451/57 | |
| 2011/0215511 A1 * | 9/2011 | Grob | 269/134 | |
| 2011/0247436 A1 * | 10/2011 | Otsuki et al. | 73/866.5 | |
| 2012/0099939 A1 * | 4/2012 | Stadtfeld | 409/38 | |
| 2012/0184183 A1 * | 7/2012 | Yanase | B23F 23/1218 | |
| | | | 451/27 | |
| 2012/0190274 A1 * | 7/2012 | Ito et al. | 451/11 | |
| 2012/0208436 A1 * | 8/2012 | Muller | 451/5 | |

(56) References Cited

U.S. PATENT DOCUMENTS

| | | | |
|---|---|---|---|
| 2012/0230791 A1* | 9/2012 | Stadtfeld | B23F 9/10 409/10 |
| 2012/0247199 A1* | 10/2012 | Hirono | G01B 5/008 73/162 |
| 2012/0309272 A1* | 12/2012 | Ando et al. | 451/47 |
| 2012/0328383 A1* | 12/2012 | Stadtfeld | 409/38 |
| 2013/0039712 A1* | 2/2013 | Stadtfeld | B23F 9/025 409/2 |
| 2013/0054172 A1* | 2/2013 | Masuo | G01B 5/202 702/94 |
| 2013/0061716 A1* | 3/2013 | Kamimura et al. | 74/7 E |
| 2013/0097865 A1* | 4/2013 | Ando et al. | 451/47 |
| 2013/0101367 A1* | 4/2013 | Mundt | B23C 5/10 409/26 |
| 2013/0130598 A1* | 5/2013 | Yanase | B24B 53/062 451/56 |
| 2013/0143471 A1* | 6/2013 | Otsuki et al. | 451/5 |
| 2013/0259591 A1* | 10/2013 | Durr | B23F 9/105 409/26 |
| 2013/0280990 A1* | 10/2013 | Geiser et al. | 451/47 |
| 2013/0288576 A1* | 10/2013 | Yanase | B23F 1/02 451/47 |
| 2013/0309026 A1* | 11/2013 | Ogasawara | B23F 21/122 407/26 |
| 2014/0271010 A1* | 9/2014 | Napau | B23F 5/22 409/12 |

\* cited by examiner

METHOD OF MANUFACTURING MULTIPLE IDENTICAL GEARS USING A GEAR CUTTING MACHINE

BACKGROUND OF THE INVENTION

The present invention relates to a method of manufacturing a plurality of identical gears by means of cutting machining on a gear cutting machine. It is in this respect in particular a method of manufacturing gears by means of hob cutting or hob grinding. The gear cutting machine is accordingly a hob cutting machine and/or a hob grinding machine.

In the method in accordance with the invention, workpieces are machined by means of a rotating tool, in particular by means of a hob cutter or by means of a worm grinding wheel, wherein the tool is brought into engagement with the workpiece via the control of NC axes of the gear cutting machine. The rotary movements of the tool and of the workpiece are in particular mutually coupled in this respect.

In this respect, the tool can be shifted by a certain distance along its axis of rotation in the course of the machining of a plurality of workpieces, and in particular on a change between workpieces, to bring another point of the tool into engagement with the workpiece. This primarily serves to load the tool uniformly over its total width where possible and to minimize the wear.

Due to tolerances becoming tighter and tighter and to the ever higher demands on gear cutting accuracy, the previously used corrections are not or are no longer sufficient to meet the high demands on the cut gear geometry. Defects in the tool, axial alignment errors, concentricity errors, wobbles, geometric errors and errors from irregular tool heating result in deviations which can make difficult or prevent a passing of statistical process evaluations with the demanded tolerances.

SUMMARY OF THE INVENTION

It is therefore the object of the present invention to provide a method of manufacturing gears which allows an even higher accuracy in the manufacture of gears.

This object is achieved in accordance with the method described herein.

The present invention in this respect includes a method of manufacturing a plurality of identical gears by means of cutting machining on a gear cutting machine, wherein workpieces are machined by means of a rotating tool. In this respect, the tool is brought into engagement with the workpiece via the control of NC axes of the gear cutting machine. Provision is in this respect made in accordance with the invention that deviations from workpiece to workpiece are compensated by a respective different control of at least one of the NC axes of the gear cutting machine. NC axes in the sense of the invention are in this respect all degrees of freedom of the gear cutting machine. These NC axes can in particular be the axial spacing between the tool and the workpiece and/or the angle of engagement of the tool. The present method in this respect advantageously serves the manufacture of a plurality of identical gears while using the same tool.

Whereas known processes for the correction of cut gear geometry are orientated on the machining of the individual workpiece, deviations from workpiece to workpiece which would otherwise be caused e.g. by the shifting of the tool are avoided by the method in accordance with the invention. Deviations from workpiece to workpiece can in particular be compensated which would be caused by the different shift position in the machining of the respective workpiece. The manufacture of the majority of workpieces in this respect advantageously takes place in an automated manner, with in particular the control of the NC axes of the machine taking place automatically.

In this respect, the tool is advantageously shifted by a certain distance along its axis of rotation in the course of the machining of a plurality of workpieces, and in particular on a change between workpieces, to bring another point of the tool into engagement with the workpiece. In this respect, each workpiece can in particular be machined at a fixed shift position which is, however, different from workpiece to workpiece. The present invention can, however, also be used in processes in which a continuous shifting of the tool takes place on the processing of a workpiece such as in diagonal cutting.

Provision is made in this respect in accordance with the invention that the control of at least one of the NC axes of the gear cutting machine takes place in dependence on the shift position of the tool on the machining of the workpiece. In this respect, in particular the spacing of the axes of tool and workpiece is controlled in dependence on the shift position. There is furthermore the possibility of also controlling further axes such as the rotary movement of the table and the shift axis.

Deviations of the tool geometry from the desired geometry which occur along the axis of rotation of the tool and would therefore result in deviations between the individual workpieces during shifting can therefore be taken into account by the method in accordance with the invention and their influence on the cut gear geometry can be compensated in that the NC axes are controlled differently in dependence on the shift position and thus from workpiece to workpiece.

The present method can in this respect in particular be used on the use of those tools which have an unchanging desired geometry along their axis of rotation. With known methods, the control of the remaining NC axes with such tools took place independently of the shift position of the tool. In accordance with the invention, in contrast, deviations between the cut gear geometry of the individual workpieces due to the different shift position of the individual workpieces in the manufacture which occur despite the unchanging desired geometry of the tool can be compensated by a control of the NC axes dependent on the shift position of the tool.

The deviations of the tool geometry in the shift direction, i.e. along the axis of rotation of the tool, can in this respect be temperature-induced deviations due to the process routine or to the heating, manufacture-induced deviations of the tool geometry from the desired geometry, clamping defects of the tool such as concentricity errors or wobbles, and also defects in the machine geometry such as alignment errors of the counter-bearing.

In this respect, in accordance with the invention, deviations in the tool geometry in the direction of shift and/or their influence on the cut gear geometry can advantageously be determined. In this respect, deviations in the tool geometry can in particular be directly determined or deviations in the workpiece geometry can be determined in dependence on the shift position used in the manufacture. These deviations then enter into the control of the NC axes in dependence on the shift position of the tool.

The method in accordance with the invention is advantageously a hob cutting process or a hob grinding process. The tool is accordingly advantageously a hob cutter or a worm grinding wheel.

The method in accordance with the invention can in this respect be used in any shift strategy. The present invention can furthermore be used in any machining process in which the shift position can have an influence on the machining result, e.g. in diagonal machining.

Provision can be made in accordance with the invention that the tool geometry and/or its influence on the cut gear geometry is determined at at least two sampling points which correspond to different shift positions of the tool.

In this respect, the tool geometry and/or its influence on the cut gear geometry over the shift range of the tool is advantageously interpolated with reference to the at least two sampling points for controlling the NC axes of the gear cutting machine. The more sampling points are used in this respect, the more precisely the actual situation can be detected and taken into account by the interpolation.

Provision can in this respect advantageously be made that in each case at least one workpiece is machined and measured at at least two, advantageously three, shift positions of the tool at the start of a machining cycle. The measured data hereby acquired can enter into the control of the NC axes in the subsequent machining cycle. The influence of deviations in the tool geometry on the gear cutting geometry which arise by the different shift positions on machining the individual workpieces can hereby be compensated.

Alternatively or additionally, data on the cut gear geometry can also enter into the control of the NC axes in dependence on the shift position from the preceding ongoing process evaluation. In this respect, in the statistical evaluation of the cut gear geometry of the individual workpieces, in particular a recurring pattern can be determined in dependence on the shift position which then goes into the control of the NC axes. The cut gear geometry can hereby be substantially improved during the process.

In the above-described variants, it is not the deviations of the tool geometry in the direction of shift which are themselves determined, but rather their influence on the cut gear geometry in that the workpieces machined at different shift positions are measured.

Alternatively or additionally, however, data on deviations of the tool geometry along its axis of rotation can also be obtained by measurement of the tool and then enter into the control of the NC axes. In this respect, pitch variations of the tool determined on a measuring machine can also enter into the control.

The present invention further relates to a gear cutting machine for manufacturing gears by means of cutting machining. It is in this respect in particular a hob cutting machine and/or a hob grinding machine. The gear cutting machine in accordance with the invention in this respect has a tool mount and a workpiece mount which can each be controlled by means of NC axes, with workpieces being able to be machined by means of a rotating tool which is brought into engagement with the workpiece via the control of NC axes of the gear cutting machine. The gear cutting machine in this respect has a machine control which enables the automatic manufacture of a plurality of identical gears. Provision is in this respect made in accordance with the invention that the machine control has a correction function by which deviations from workpiece to workpiece are compensated by a respective different control of at least one of the NC axes of the gear cutting machine.

Deviations from workpiece to workpiece which could e.g. arise due to deviations in the tool geometry along the axis of rotation which could e.g. arise due to heating of the tool, due to a different geometry of the tool in dependence on its shift position due to manufacturing defects, due to clamping errors of the tool and due to geometry errors of the machine can also be compensated by the correction function in accordance with the invention.

The machine control in this respect advantageously includes a shift function by which the tool can be shifted by a specific distance along its axis of rotation in the course of the machining of a plurality of workpieces, and in particular on a change between workpieces, to bring a different point of the tool into engagement with the workpiece. In accordance with the invention, the machine control now has a correction function by which the control of at least one of the NC axes of the gear cutting machine takes place in dependence on the respective shift position of the tool. The influence of deviations in the tool geometry along the axis of rotation on the cut gear geometry can hereby be compensated by a control of the NC axes of the gear cutting machine in dependence on the shift position of the tool. A method such as was described above can advantageously be carried out on the gear cutting machine in this respect. The machine control advantageously has corresponding functions for this purpose, in particular a corresponding operator guidance.

The gear cutting machine in this respect advantageously has an input function by which measured data for at least two sampling points which correspond to different shift positions of the tool can be input. The input can take place manually or electronically in this respect.

Provision is advantageously made in this respect that the different shift positions of the tool are automatically traveled to by the input function so that workpieces can be machined at these sampling points whose tool geometry can in turn be input as measured data into the input function. The gear cutting machine in accordance with the invention advantageously has a corresponding user guidance for this purpose.

The machine control in this respect advantageously interpolates the measured data on the at least two sampling points for controlling the NC axes of the gear cutting machine in dependence on the shift position.

It would furthermore be possible to define corrections by the definition of specific correction functions such as splines, polynomials, sine curves, rectangular functions or similar.

Alternatively or additionally, provision can be made that measured data of a measuring device, via which deviations of the tool geometry along the axis of rotation and/or their influence on the cut gear geometry, can be read in by the input function.

The measuring device can in this respect be a measuring device for measuring a tool geometry and/or a cut gear geometry. It is in this respect in particular a measuring device for determining the tool geometry in dependence on the shift position of the tool, in particular a measuring machine for determining pitch variations of a hob cutter.

The data transfer can in this respect advantageously take place electronically. This allows a particularly simple data transfer.

In the method in accordance with the invention or in the corresponding machine control e.g. the tooth width dimension and/or the sphere dimension can in this respect be used as measured values for the serration geometry. However, further dimensions specific to gear cutting can also be taken into account such as the root circle diameter or the outer diameter.

The present invention in this respect furthermore includes a control program for a gear cutting machine for carrying out a method as was presented above. Such a control program can in particular in this respect be installed on the machine control of a gear cutting machine and allows an operator to carry out a method in accordance with the invention by the provision of corresponding functions. The control program can in this respect be provided on a data carrier, for example.

BRIEF DESCRIPTION OF THE DRAWINGS

The present invention will now be described in more detail with reference to an embodiment and to drawings. There are shown.

DESCRIPTION OF THE PREFERRED EMBODIMENTS

Figure 1:
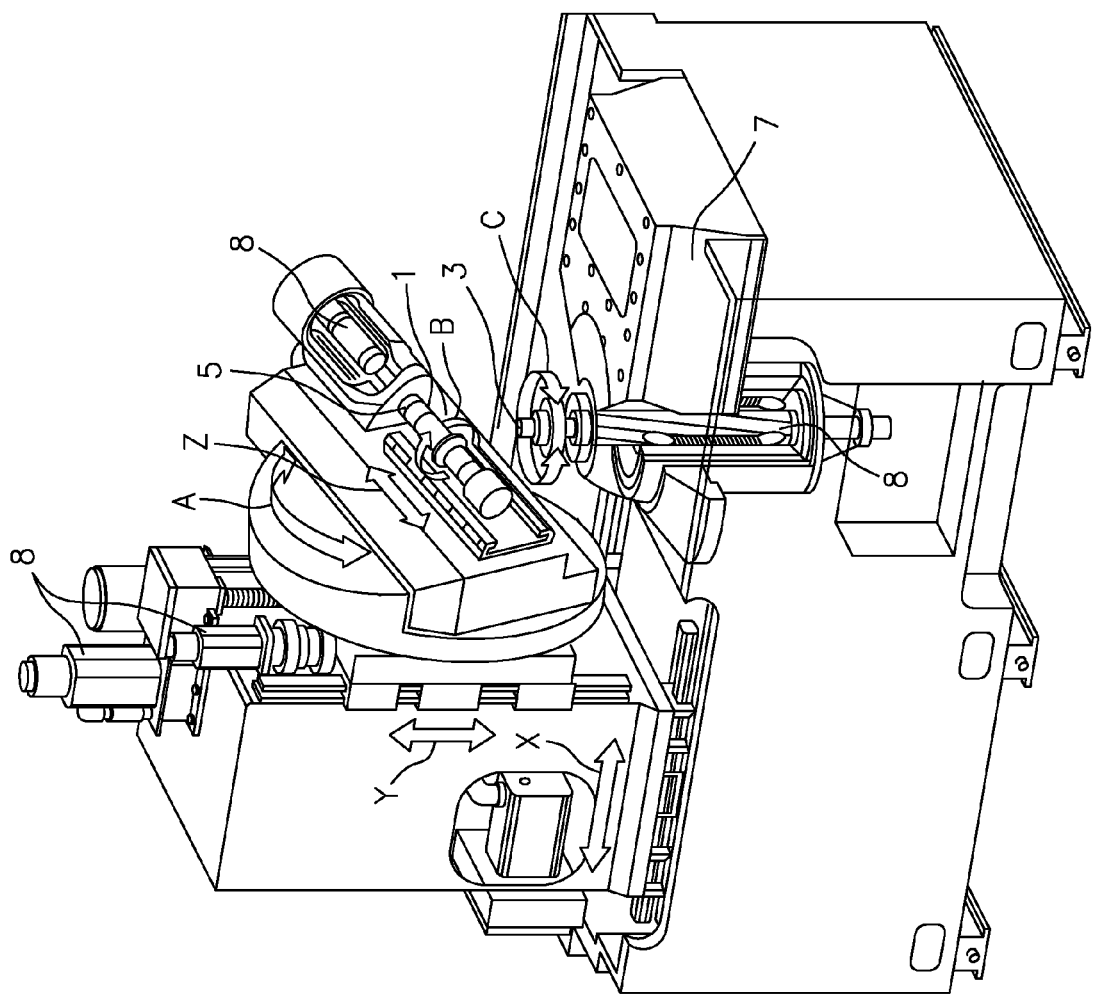
FIG. 1: an embodiment of a gear cutting machine in accordance with the invention.

FIG. 1 shows an embodiment of a gear cutting machine in accordance with the invention. The gear cutting machine in this respect has a tool mount 5 via which a tool 1 can be clamped. In this respect, a drive 8 is provided via which the tool is driven about its axis of rotation in the direction of rotation B. The gear cutting machine furthermore has a workpiece mount 3 via which a workpiece can be clamped. The workpiece mount can also be rotated via a drive 8 in the direction of rotation C.

The engagement of the tool 1 at the workpiece in this respect takes place along the degree of freedom X by which the axial spacing between the workpiece mount 3 and the tool mount 1 can be set. The tool 1 can be moved parallel to the axis of rotation of the workpiece mount 3, that is in the direction of the tooth width, by a displacement along the degree of freedom Z. The gear cutting machine furthermore allows a rotation of the tool 1 in the direction of rotation A in order e.g. to enable slanted gear cutting.

The gear cutting machine is in this respect advantageously a hob cutting machine or a hob grinding machine. During hob cutting or hob grinding, the rotary movement B of the tool 1 is coupled to the rotation C of the workpiece at the workpiece mount so that the tool geometry hobs on the cut gear geometry of the workpiece.

To bring different points of the tool into engagement with the workpiece and thus to be able to distribute the process energy better over the tool, the tool mount 5 is displaceable parallel to the axis of rotation of the tool along the axis V. Such a displacement of the tool along the axis V is called shifting.

During shifting, on the machining of a plurality of workpieces, the tool is shifted by a specific distance along its axis of rotation, that is in the direction V, in particular in each case on the change between two workpieces, to bring a different point of the tool into engagement with the workpiece. The tool in this respect has an unchanging desired geometry along its axis of rotation.

Figure 2:
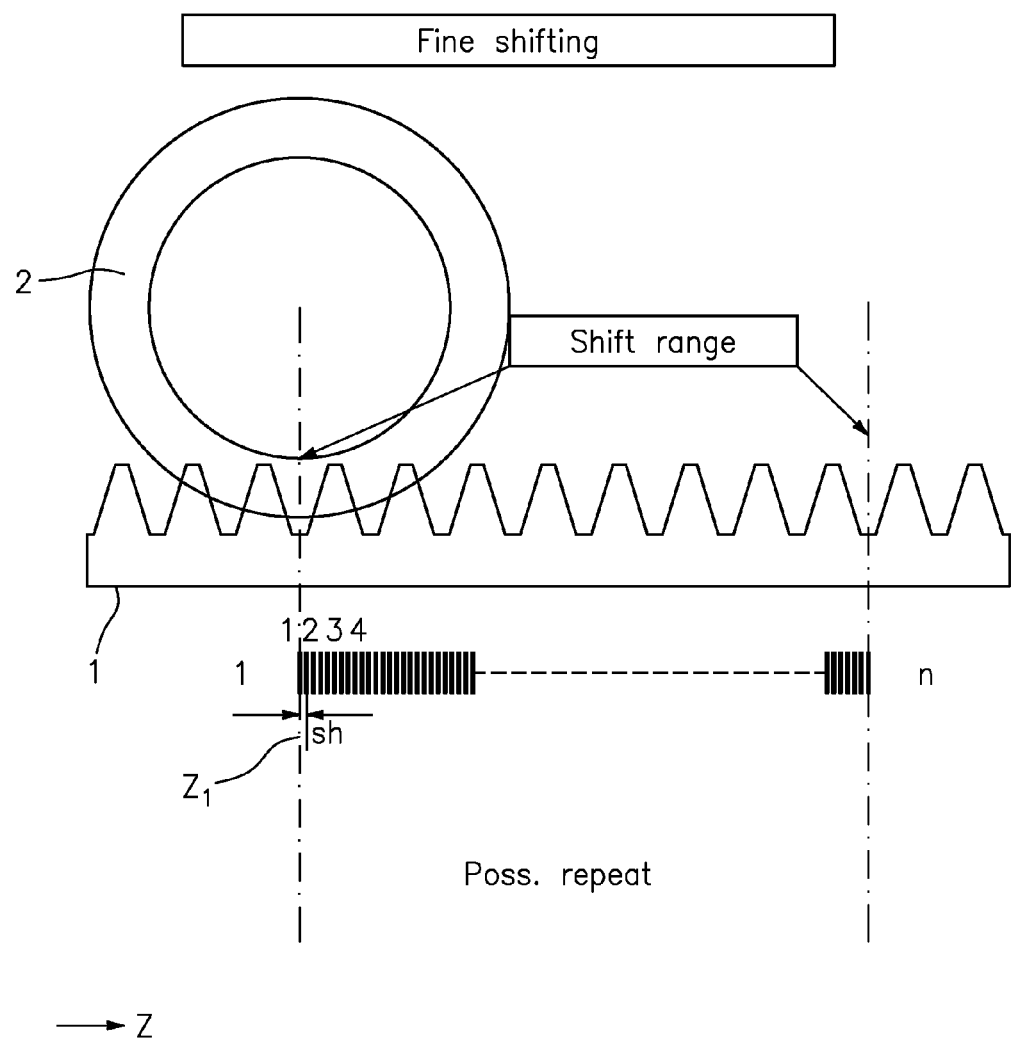
FIG. 2: the schematic diagram of a fine shift method used in accordance with the invention.
Figure 3:
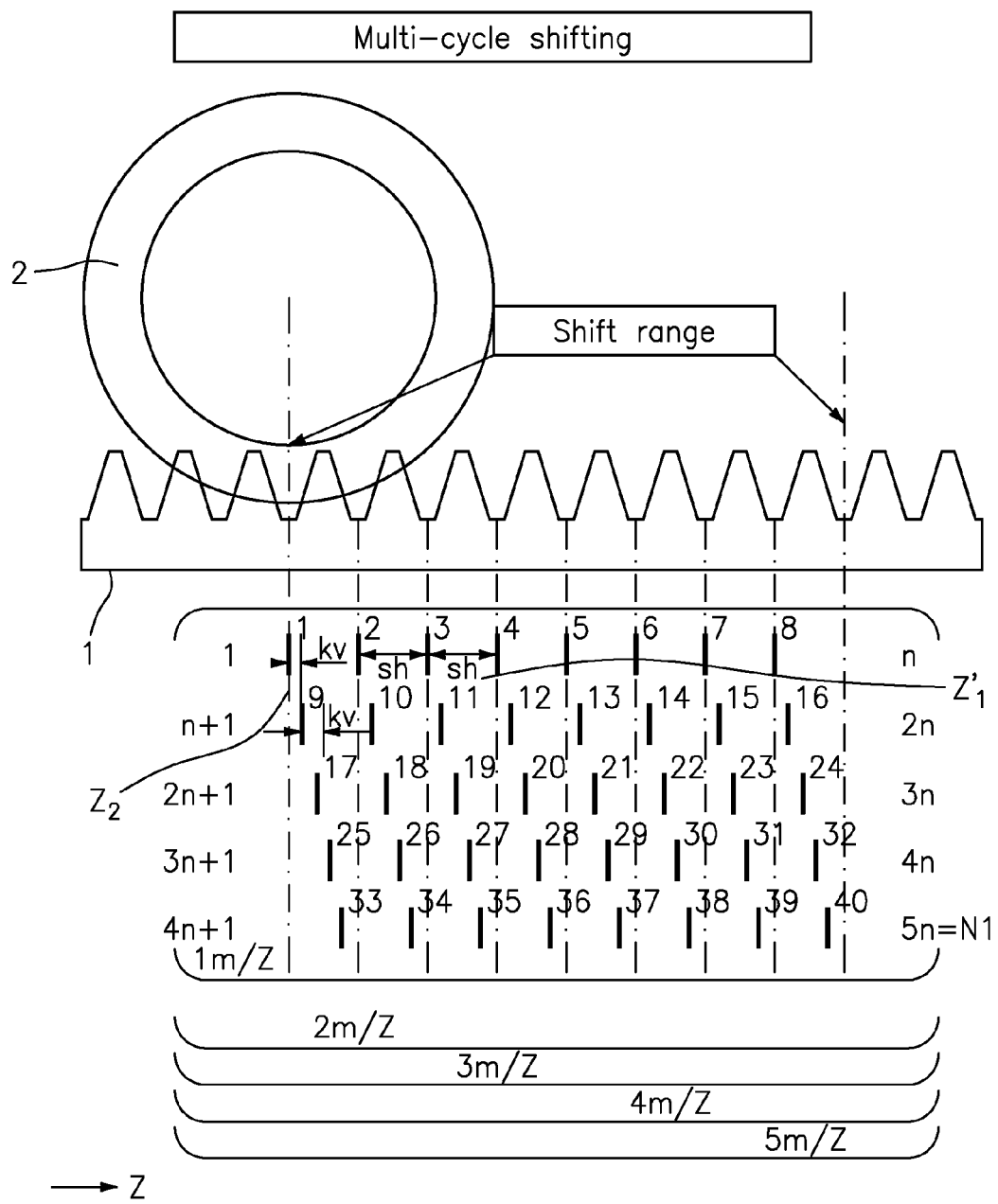
FIG. 3: the schematic diagram of a multi-cycle shift method used in accordance with the invention.

In FIGS. 2 and 3, two different shift strategies are shown such as can be used in the method in accordance with the invention. On the fine shifting shown in FIG. 2, only a very small shift jump v1 takes place after machining a workpiece so that the tool 1 is only shifted very slowly from workpiece to workpiece during the manufacturing process. The advantage of this procedure is that the shift strategy to be used can be calculated extremely simply. On the multi-cycle shifting shown in FIG. 3, in contrast, after machining a tool, a relatively large shift jump v1' takes place which typically corresponds to the axial pitch of the toothed arrangement of the tool or to a multiple thereof. The process is repeated over the total shift range after every run, with a small offset v2, however, being carried out with respect to the positions in the preceding run. In this respect, the method in accordance with the invention can be used in the same way in both shift strategies.

These deviations, which arise due to the different shift positions, can be compensated by the present invention or can be balanced by a corresponding control of the NC axes. For this purpose, for example, values of a statistical process evaluation which has already taken place can be input into the machine control. It is additionally or alternatively possible to generate workpieces directly at specific positions and to input their measurement results into the machine control. Measurement results from a tool measuring protocol can also be used for the correction of pitch deviations. For this purpose, the machine control has corresponding functions from a software aspect.

The deviation of the tool geometry from the desired geometry in the shift direction or its influence on the cut gear geometry is in this respect compensated in accordance with the invention in that the control of the NC axes of the gear cutting machine take place in dependence on the shift position. In this respect, changes in the axial spacing between the workpiece and the tool are in particular carried out in dependence on the shift position. Deviations between the individual workpieces which were produced by respective different shift positions can hereby be compensated or minimised. In this respect, both deviations in the tool geometry from the desired geometry due to pitch deviations at the tool, due to temperature changes at the tool or workpiece, due to clamping errors and due to geometry errors of the machine can be compensated in that the position of the tool is determined in the X direction in dependence on the shift position in the V direction, in particular individually for each workpiece.

The method in accordance with the invention, which allows a particularly uniform cut gear geometry from workpiece to workpiece, can in this respect naturally be combined with known processes for correcting the cut gear geometry of individual workpieces.

Figure 4:
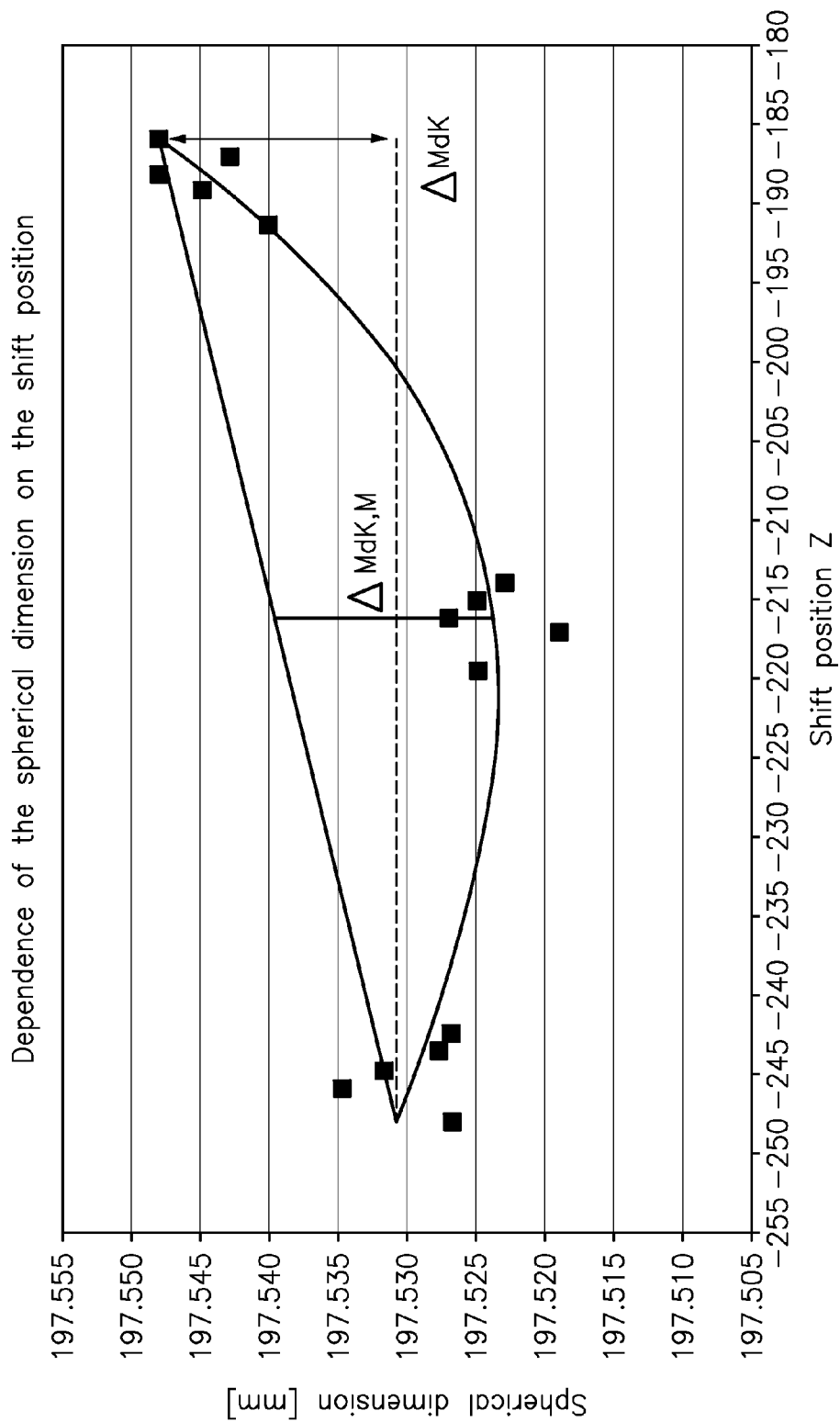
FIG. 4: a diagram which shows deviations of the cut gear geometry in dependence on the shift position of the tool.

A first embodiment of the present invention will now be presented with reference to FIG. 4, wherein deviations in the cut gear geometry in shifting which are caused by pitch deviations in the tool can be compensated. In this respect, pitch deviations in the tool can result in fluctuations of the tooth thickness along the tool which also present as tooth thickness change (or spherical dimension change) or tooth width change in the workpieces. The compensation of this tooth thickness variation takes place in accordance with the invention via a corresponding engagement of the X axis in dependence on the shift position.

For this purpose, the magnitude of the tooth thickness change must first be determined for the total shift range with reference to the spherical dimension or the tooth width. For this purpose, the spherical dimension or the tooth width is determined at individual sampling points over the shift range and a corresponding interpolation is carried out. On a linear interpolation, the dimension at the shift start and at the shift end has to be determined by machining and measuring one or more workpieces. With parabolic interpolation, one or more workpieces is/are additionally machined and evaluated at the middle of the shift range. Even more sampling points are naturally also possible. The shift positions for providing the data are advantageously proposed by the machine control.

The values measured for the respective shift positions are input into the machine control by the operator, for which purpose a corresponding input function is provided. The control calculates the required corrections in the X direction in dependence on the shift position from these values and takes them into account in the production of the gears in the following production. The input function is designed in this respect so that the input of the measured values is selectively possible via the spherical dimension or via the tooth width. Alternatively, other values specific to gear cutting can also be used.

The input values are in this respect compared with the programmed desired value (e.g. desired spherical dimension) and are used for the axial spacing correction. Provision can be made in this respect that the machine displays the maximum deviations and/or the course of the deviation over the shift range on a display, in particular graphically. Provision can further be made that the moving to and machining of the plurality of workpieces for providing the sampling points is carried out automatically by the machine.

Provision can furthermore be made that pitch variations of the tool determined via a measuring machine can be read into or input into the machine control. The machine control calculates the required corrections in the Y direction from these to compensate the effect of the deviation of the tool geometry from the desired geometry, that is the tooth thickness fluctuations at the workpiece actually resulting from these deviations.

Figure 5:
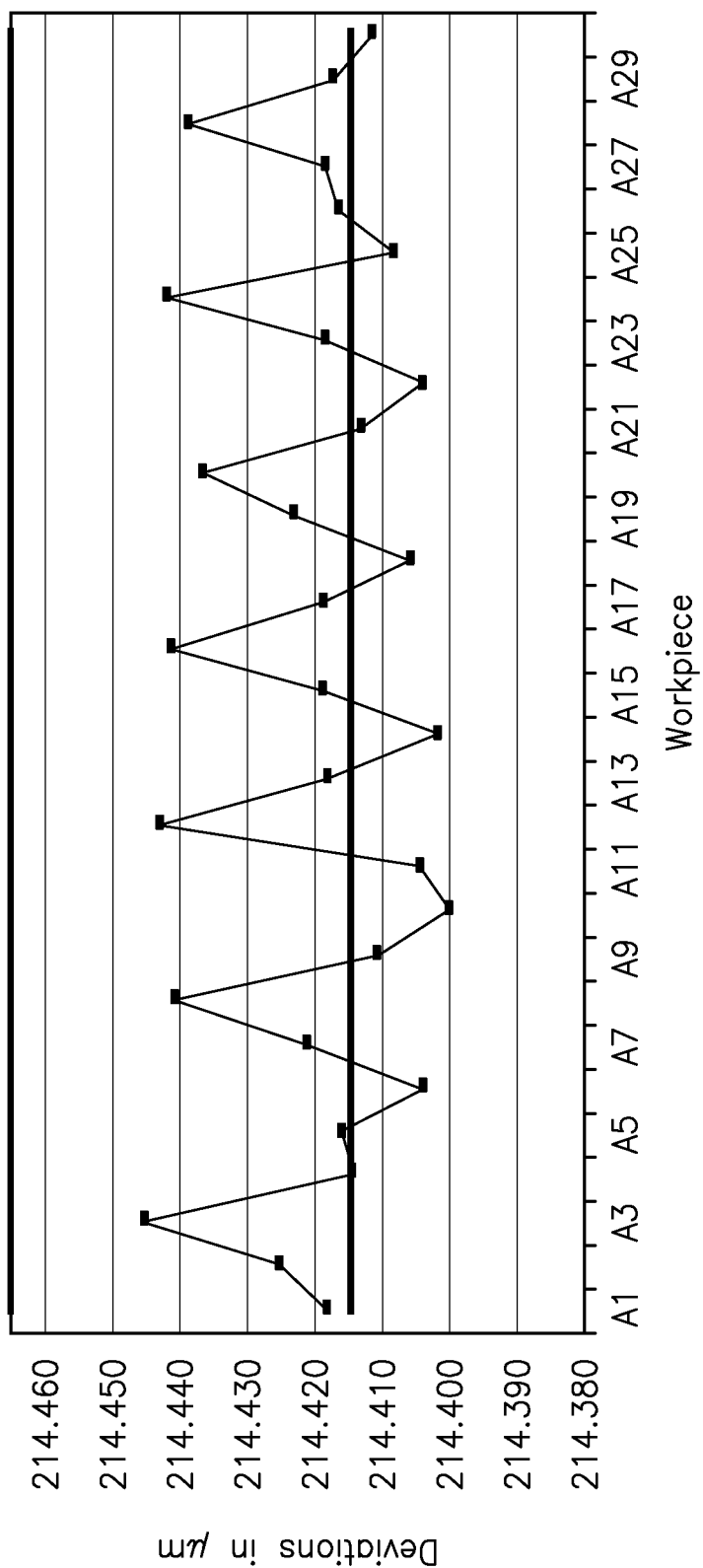
FIG. 5: a diagram which shows deviations of the cut gear geometry from workpiece to workpiece in a production process in multi-cycle shifting.

A second embodiment of the method in accordance with the invention will now be presented with reference to FIG. 5. In this respect, a parameter of the workpieces specific to the cut gear is measured and statistically detected over the production process. In this respect, the deviation from the spherical dimension is entered in FIG. 5 in µm for the workpieces A1 to A29. As can be seen from the drawing, in this respect a saw tooth design is given which repeats with every shift run in the multi-cycle shifting used. The same effect is, however, also present in the conventional fine shifting, with the deviations, however, being distributed over a larger number of workpieces, that is the saw tooth is considerably wider or presents itself in the form of a ramp.

In accordance with the invention, the measurement data on the already machined workpieces can now be evaluated and can enter into the control of the NC axes in the following machining cycle. In this respect, in particular a change in the X spacing can be carried out in dependence on the shift position, with the relationship between the shift position and the X spacing being taken from the statistics of the already machined workpieces. The control of the X position of the tool in this respect takes place conversely to the saw tooth pattern visible in FIG. 5 so that the different axial spacings compensate the deviations from the desired cut gear geometry.

The direct manufacture of workpieces at different sampling points, the taking into account of statistically detected values and/or the measurement of the tool can in this respect also be combined.

The method in accordance with the invention in which a different delivery status of the tool is used from workpiece to workpiece in this respect allows an excellent cut gear geometry over the total production procedure. Unlike in known processes which relate to corrections to an individual workpiece, the cut gear quality can thus be substantially improved overall.

The invention claimed is:

1. A method of manufacturing a multiple of identical gears by cutting machining, in particular gear cutting or gear hob grinding, on a gear cutting machine,
wherein workpieces are machined by a rotating tool which is brought into engagement with the workpiece via the control of NC axes of the gear cutting machine,
wherein the tool is shifted for each workpiece during the machining of a plurality of workpieces by a determined distance along its axis of rotation to bring a different point of the tool into engagement with the each workpiece of the plurality of workpieces,
wherein deviations from workpiece to workpiece due to the tool geometry and/or its influence on the cut gear geometry at the different point of the tool are compensated by a respective different control of at least one of the NC axes of the gear cutting machine;
wherein deviations of the tool geometry in the shift direction and/or their influence on the cut gear geometry are determined, in particular with respect to the tooth thickness; and
wherein the tool geometry and/or its influence on the cut gear geometry is determined at least at two sampling points which correspond to different shift positions of the tool, and advantageously the tool geometry and/or its influence on the cut gear geometry over the shift range of the tool is interpolated with reference to the at least two sampling points to control the NC axes of the gear cutting machine.

2. A method in accordance with claim 1, wherein the tool is shifted on a change between workpieces; and
the control of at least one of the other NC axes of the gear cutting machine takes place in dependence on the respective shift position of the tool on the machining of the workpieces.

3. A method in accordance with claim 1, wherein the tool geometry and/or its influence on the cut gear geometry is input as a function of the shift position by inputting a function, and it is used for calculating the correction function for the control of the NC axes of the gear cutting machine.

4. A method in accordance with claim 1, wherein a correction of the cut gear geometry of the individual workpiece is carried out in addition to the control for compensating deviations from workpiece to workpiece.

5. A method in accordance with claim 1, wherein in each case at least one workpiece is machined and measured at least at two, advantageously three, shift positions of the tool at the start of a machining cycle, and the measurement data enter into the control of the NC axes in the following machining cycle.

6. A method in accordance with claim 1, wherein data on the cut gear geometry enter into the control of the NC axes in dependence on the shift position from the preceding ongoing process evaluation.

7. A method in accordance with claim 1, wherein data on deviations of the tool geometry along its axis of rotation obtained by a measurement of the tool enter into the control of the NC axes.

8. A method in accordance with claim 1, wherein the tool geometry and/or its influence on the cut gear geometry is input as a function of the shift position by inputting a function, and it is used for calculating the correction function, for the control of the NC axes of the gear cutting machine.

9. A method in accordance with claim 8, wherein a correction of the cut gear geometry of the individual workpiece is carried out in addition to the control for compensating deviations from workpiece to workpiece.

10. A non-transitory computer readable medium comprising instructions, which when executed by a processor controls the manufacturing of multiple of identical gears by a cutting machining, in particular gear cutting or gear hob grinding, on a gear cutting machine,
   wherein workpieces are machined by a rotating tool which is brought into engagement with the workpiece via the control of NC axes of the gear cutting machine;
   wherein the tool is shifted for each workpiece during the machining of a plurality of workpieces by a determined distance along its axis of rotation to bring a different point of the tool into engagement with the each workpiece of the plurality of workpieces;
   wherein deviations from workpiece to workpiece due to the tool geometry and/or its influence on the cut gear geometry at the different point of the tool are compensated by a respective different control of at least one of the NC axes of the gear cutting machine;
   wherein deviations of the tool geometry in the shift direction and/or their influence on the cut gear geometry are determined, in particular with respect to the tooth thickness; and
   wherein the tool geometry and/or its influence on the cut gear geometry is determined at least at two sampling points which correspond to different shift positions of the tool, and advantageously the tool geometry and/or its influence on the cut gear geometry over the shift range of the tool is interpolated with reference to the at least two sampling points to control the NC axes of the gear cutting machine.

11. A gear cutting machine for manufacturing gears by cutting machining, in particular a gear hob cutting machine and/or a gear hob grinding machine, having a tool mount and a workpiece mount which can each be controlled by NC axes, with workpieces being able to be machined by a rotating tool which is brought into engagement with the workpiece via the control of NC axes of the gear cutting machine; and
   a machine control which allows the automatic manufacture of a plurality of identical gears;
      wherein the machine control has a shift function by which the tool can be shifted for each workpiece by a specific distance along its axis of rotation in the course of machining of a plurality of workpieces to bring a different point of the tool into engagement with the workpiece which allows the automatic manufacture of a plurality of identical gears; and
   wherein the machine control has a correction function by which deviations from workpiece to workpiece due to the tool geometry and/or its influence on the cut gear geometry at the different point of the tool are compensated by a respective different control of at least one of the NC axes of the gear cutting machine;
   wherein deviations of the tool geometry in the shift direction and/or their influence on the cut gear geometry are determined, in particular with respect to the tooth thickness; and
   wherein the tool geometry and/or its influence on the cut gear geometry is determined at least at two sampling points which correspond to different shift positions of the tool, and advantageously the tool geometry and/or its influence on the cut gear geometry over the shift range of the tool is interpolated with reference to the at least two sampling points to control the NC axes of the gear cutting machine.

12. A gear cutting machine in accordance with claim 11, wherein the tool is shifted on a change between workpieces; and the control of at least one of the other NC axes of the gear cutting machine takes place by the correction function in dependence on the respective shift position of the tool.

13. A method in accordance with claim 11, wherein the tool geometry and/or its influence on the cut gear geometry is input as a function of the shift position by inputting a function, and it is used for calculating the correction function for the control of the NC axes of the gear cutting machine.

14. A method in accordance with claim 13, wherein a correction of the cut gear geometry of the individual workpiece is carried out in addition to the control for compensating deviations from workpiece to workpiece.

15. A method in accordance with claim 11, wherein the tool geometry and/or its influence on the cut gear geometry is input as a function of the shift position by inputting a function, and it is used for calculating the correction function for the control of the NC axes of the gear cutting machine.

16. A method in accordance with claim 15, wherein a correction of the cut gear geometry of the individual workpiece is carried out in addition to the control for compensating deviations from workpiece to workpiece.

* * * * *